United States Patent
Vito

(10) Patent No.: US 12,274,318 B2
(45) Date of Patent: *Apr. 15, 2025

(54) APPARATUSES, SYSTEMS AND METHODS FOR EQUIPMENT FOR PROTECTING THE HUMAN BODY BY ABSORBING AND DISSIPATING FORCES IMPARTED TO THE BODY

(71) Applicant: MATSCITECHNO LICENSING COMPANY, Kennett Square, PA (US)

(72) Inventor: Robert A. Vito, Kennett Square, PA (US)

(73) Assignee: MATSCITECHNO LICENSING COMPANY, Kennett Square, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/407,568

(22) Filed: Jan. 9, 2024

(65) Prior Publication Data
US 2024/0277085 A1    Aug. 22, 2024

Related U.S. Application Data

(63) Continuation of application No. 15/383,770, filed on Dec. 19, 2016, now Pat. No. 11,864,599.
(Continued)

(51) Int. Cl.
*A41D 13/015* (2006.01)
*A41D 13/05* (2006.01)
(Continued)

(52) U.S. Cl.
CPC ....... *A41D 13/0518* (2013.01); *A41D 13/015* (2013.01); *A41D 31/285* (2019.02);
(Continued)

(58) Field of Classification Search
CPC ................ A41D 13/0518; A41D 13/15; A41D 13/0543; A41D 13/00; A41D 13/0512;
(Continued)

(56) References Cited

U.S. PATENT DOCUMENTS

| | | |
|---|---|---|
| 55,994 A | 7/1866 | Bocking |
| 287,480 A | 10/1883 | Smith |

(Continued)

FOREIGN PATENT DOCUMENTS

| | | |
|---|---|---|
| CH | 689008 A5 | 7/1998 |
| CN | 1980780 A | 6/2007 |

(Continued)

OTHER PUBLICATIONS

US 3,682,882, 1/1975, Marzocchi (withdrawn)
(Continued)

*Primary Examiner* — Jillian K Pierorazio
(74) *Attorney, Agent, or Firm* — Riverside Law LLP

(57) ABSTRACT

The disclosed apparatus, system and method includes at least a protective garment that prevents concussive effects on internal organs. The garment many include a garment body; and, embedded in the garment body, at least one multi-sectional pad. At least two of the multi-sections may comprise: at least one aramid layer; at least one multi-durometer foam layer having a substantially similar surface area to that provided by the at least one aramid layer; and at least one shield layer.

15 Claims, 3 Drawing Sheets

Related U.S. Application Data

(60) Provisional application No. 62/269,723, filed on Dec. 18, 2015.

(51) Int. Cl.
 *A41D 31/28* (2019.01)
 *B32B 5/26* (2006.01)
 *F41H 5/04* (2006.01)

(52) U.S. Cl.
 CPC .............. *B32B 5/26* (2013.01); *F41H 5/0478* (2013.01); *A41D 13/05* (2013.01)

(58) Field of Classification Search
 CPC .............. A41D 13/015; A41D 13/0562; A41D 31/0011; A42B 3/00; A42B 1/08
 See application file for complete search history.

(56) References Cited

U.S. PATENT DOCUMENTS

| | | |
|---|---|---|
| 379,208 A | 3/1888 | Cosper |
| 470,754 A | 3/1892 | Hartig |
| 473,649 A | 4/1892 | Whitcomb |
| 559,940 A | 5/1896 | Gantt |
| 1,125,010 A | 1/1915 | Donner |
| 1,125,029 A | 1/1915 | Lard |
| 1,135,259 A | 4/1915 | Cokely |
| 1,195,994 A | 8/1916 | Lard |
| 1,195,995 A | 8/1916 | Leitch |
| 1,498,838 A | 6/1924 | Harrison, Jr. |
| 1,522,952 A | 1/1925 | Goldsmith |
| 1,551,203 A | 8/1925 | Mills |
| 1,602,727 A | 10/1926 | Turner |
| 1,620,118 A | 3/1927 | Mattern |
| 1,701,856 A | 2/1929 | Kraeuter |
| 1,772,414 A | 8/1930 | Brooke-Hunt |
| 2,023,131 A | 12/1935 | Gibson |
| 2,042,804 A | 6/1936 | Ridgers |
| 2,099,521 A | 11/1937 | Herkimer |
| 2,420,522 A | 5/1947 | Daly |
| 2,455,797 A | 12/1948 | Myers |
| 2,532,442 A | 12/1950 | Daly |
| 2,607,709 A | 8/1952 | Simpson |
| 2,610,322 A | 9/1952 | Daly |
| 2,610,332 A | 9/1952 | Field |
| 2,753,561 A | 7/1956 | Mauro |
| 2,871,899 A | 2/1959 | Coyle |
| 2,926,355 A | 3/1960 | Finken |
| 2,969,547 A | 1/1961 | Dye |
| 3,018,483 A | 1/1962 | Austin |
| 3,067,427 A | 12/1962 | McClintock, Sr. |
| 3,129,003 A | 4/1964 | Mueller |
| 3,153,792 A | 10/1964 | Marietta |
| 3,197,784 A | 8/1965 | Carlisle |
| 3,208,080 A | 9/1965 | Hirsch |
| 3,241,154 A | 3/1966 | Aileo |
| 3,242,500 A | 3/1966 | Derr |
| 3,256,130 A | 6/1966 | Nisbet |
| 3,290,893 A | 12/1966 | Haldopoulos |
| 3,315,273 A | 4/1967 | Bullard |
| 3,353,981 A | 11/1967 | Jacob |
| 3,388,405 A | 6/1968 | Simpson |
| 3,398,233 A | 8/1968 | De Lizasoain |
| 3,500,473 A | 3/1970 | Marchello |
| 3,512,190 A | 5/1970 | Buff |
| 3,515,625 A | 6/1970 | Sedlak |
| 3,529,306 A | 9/1970 | Thorne |
| 3,568,210 A | 3/1971 | Marietta |
| 3,577,562 A | 5/1971 | Holt |
| 3,582,990 A | 6/1971 | Frieder |
| 3,606,326 A | 9/1971 | Sparks |
| 3,609,764 A | 10/1971 | Morgan |
| 3,665,514 A | 5/1972 | Durand |
| 3,716,433 A | 2/1973 | Plummer |
| 3,730,509 A | 5/1973 | Jorn |
| 3,779,551 A | 12/1973 | Wilson |
| 3,783,450 A | 1/1974 | O Connor |
| 3,791,050 A | 2/1974 | Egtvedt |
| 3,843,970 A | 10/1974 | Marietta |
| 3,845,389 A | 10/1974 | Phillips |
| 3,862,882 A | 1/1975 | Marzocchi |
| 3,882,547 A | 5/1975 | Morgan |
| 3,897,596 A | 8/1975 | Aileo |
| 3,906,546 A | 9/1975 | Gooding |
| 3,994,020 A | 11/1976 | Villari |
| 3,994,021 A | 11/1976 | Villari |
| 3,994,023 A | 11/1976 | Aileo |
| 4,015,041 A | 3/1977 | Koschatzky |
| 4,015,851 A | 4/1977 | Pennell |
| 4,035,847 A | 7/1977 | Prince |
| 4,044,625 A | 8/1977 | D Haem |
| 4,073,020 A | 2/1978 | Stalter |
| 4,134,198 A | 1/1979 | Briggs |
| 4,143,109 A | 3/1979 | Stockum |
| 4,147,443 A | 4/1979 | Skobel |
| 4,170,158 A | 10/1979 | Weaver |
| 4,197,611 A | 4/1980 | Bell |
| 4,217,705 A | 8/1980 | Donzis |
| 4,232,069 A | 11/1980 | Windecker |
| 4,233,687 A | 11/1980 | Lancellotti |
| 4,237,177 A | 12/1980 | Slama |
| 4,261,567 A | 4/1981 | Uffindell |
| 4,268,574 A | 5/1981 | Peccenini |
| 4,282,610 A | 8/1981 | Steigerwald |
| 4,338,270 A | 7/1982 | Uffindell |
| 4,338,600 A | 7/1982 | Leach |
| 4,347,280 A | 8/1982 | Lau |
| D267,287 S | 12/1982 | Gooding |
| 4,375,108 A | 3/1983 | Gooding |
| 4,404,690 A | 9/1983 | Farquharson |
| 4,417,042 A | 11/1983 | Dziark |
| 4,432,099 A | 2/1984 | Grick |
| 4,483,972 A | 11/1984 | Mitchell |
| 4,484,364 A | 11/1984 | Mitchell |
| 4,504,991 A | 3/1985 | Klancnik |
| 4,513,449 A * | 4/1985 | Donzis .............. A41D 13/0587 2/24 |
| 4,525,875 A * | 7/1985 | Tomczak ............ A41D 13/0518 2/466 |
| 4,526,828 A | 7/1985 | Fogt |
| 4,552,713 A | 11/1985 | Cavicchioli |
| 4,567,091 A | 1/1986 | Spector |
| 4,573,276 A | 3/1986 | Torczon |
| 4,575,446 A | 3/1986 | Schaefer |
| 4,584,232 A | 4/1986 | Frank |
| 4,591,160 A | 5/1986 | Piragino |
| 4,596,056 A | 6/1986 | Grick |
| 4,597,578 A | 7/1986 | Lancaster |
| 4,613,537 A | 9/1986 | Krupper |
| 4,627,114 A | 12/1986 | Mitchell |
| 4,660,832 A | 4/1987 | Shomo |
| 4,668,563 A | 5/1987 | Buese |
| 4,691,160 A | 9/1987 | Ino |
| 4,706,788 A | 11/1987 | Inman |
| 4,714,650 A | 12/1987 | Obayashi |
| 4,736,949 A | 4/1988 | Muroi |
| 4,746,949 A | 5/1988 | Takei |
| 4,766,028 A | 8/1988 | Rich |
| 4,819,939 A | 4/1989 | Kobayashi |
| 4,833,735 A | 5/1989 | Long |
| 4,856,119 A | 8/1989 | Haeberle |
| 4,864,738 A | 9/1989 | Horovitz |
| 4,884,295 A | 12/1989 | Cox |
| 4,901,387 A | 2/1990 | Luke |
| 4,912,836 A | 4/1990 | Avetoom |
| 4,918,757 A | 4/1990 | Janssen |
| 4,919,420 A | 4/1990 | Sato |
| 4,928,131 A | 5/1990 | Onozawa |
| 4,932,076 A | 6/1990 | Giorgio |
| 4,948,131 A | 8/1990 | Nakanishi |
| 4,953,862 A | 9/1990 | Uke |
| 4,963,989 A | 10/1990 | Morton |
| 4,983,242 A | 1/1991 | Reed |

(56) References Cited

U.S. PATENT DOCUMENTS

| | | | |
|---|---|---|---|
| 4,989,265 A * | 2/1991 | Nipper | A41D 13/0518 |
| | | | 2/92 |
| 4,989,643 A | 2/1991 | Walton | |
| 4,996,724 A | 3/1991 | Dextrase | |
| 5,005,254 A | 4/1991 | Uffindell | |
| 5,010,609 A | 4/1991 | Farley | |
| 5,012,533 A | 5/1991 | Raffler | |
| 5,014,365 A | 5/1991 | Schulz | |
| 5,020,156 A * | 6/1991 | Neuhalfen | A63B 71/12 |
| | | | 2/92 |
| 5,035,009 A | 7/1991 | Wingo, Jr. | |
| 5,042,804 A | 8/1991 | Uke | |
| 5,083,361 A | 1/1992 | Rudy | |
| 5,083,780 A | 1/1992 | Walton | |
| 5,087,491 A | 2/1992 | Barrett | |
| 5,088,126 A | 2/1992 | Mathis | |
| 5,088,129 A | 2/1992 | Kamata | |
| 5,088,734 A | 2/1992 | Glava | |
| 5,089,734 A | 2/1992 | Bickraj | |
| 5,090,129 A | 2/1992 | Cunningham | |
| 5,110,653 A | 5/1992 | Landi | |
| 5,119,505 A | 6/1992 | Tisseront | |
| 5,119,514 A | 6/1992 | Woehl | |
| 5,119,614 A | 6/1992 | Rex | |
| 5,120,597 A | 6/1992 | Takimoto | |
| 5,122,405 A | 6/1992 | Landi | |
| 5,137,769 A | 8/1992 | Landi | |
| 5,173,970 A | 12/1992 | Shifrin | |
| 5,177,815 A | 1/1993 | Andujar | |
| 5,193,246 A | 3/1993 | Huang | |
| 5,199,706 A | 4/1993 | Chen | |
| 5,199,708 A | 4/1993 | Lucas | |
| 5,203,561 A | 4/1993 | Lanctot | |
| 5,226,180 A | 7/1993 | Leach | |
| 5,231,766 A | 8/1993 | Pavlak | |
| 5,240,247 A | 8/1993 | Didier | |
| 5,249,347 A | 10/1993 | Martinitz | |
| 5,251,665 A | 10/1993 | Schaufeld | |
| 5,254,391 A | 10/1993 | Davis | |
| 5,258,088 A | 11/1993 | Wu | |
| 5,261,665 A | 11/1993 | Downey | |
| 5,267,487 A | 12/1993 | Falco | |
| 5,269,026 A | 12/1993 | McManus | |
| 5,269,516 A | 12/1993 | Janes | |
| 5,271,103 A | 12/1993 | Darnell | |
| 5,282,618 A | 2/1994 | Hong | |
| 5,289,591 A | 3/1994 | Andersen | |
| 5,290,036 A | 3/1994 | Fenton | |
| 5,294,119 A | 3/1994 | Benoit | |
| 5,294,181 A * | 3/1994 | Rose | A61G 5/1045 |
| | | | 297/452.57 |
| 5,298,208 A | 3/1994 | Sibley | |
| 5,308,675 A | 5/1994 | Crane | |
| 5,319,867 A | 6/1994 | Weber | |
| 5,322,280 A | 6/1994 | Wu | |
| 5,322,285 A | 6/1994 | Turner | |
| 5,322,290 A | 6/1994 | Minami | |
| 5,333,861 A | 8/1994 | Mills | |
| 5,337,420 A | 8/1994 | Haysom | |
| 5,338,600 A | 8/1994 | Fitchmun | |
| 5,339,793 A | 8/1994 | Findley | |
| 5,348,302 A | 9/1994 | Sasamoto | |
| 5,348,303 A | 9/1994 | Swissheim | |
| 5,355,552 A | 10/1994 | Huang | |
| 5,355,562 A | 10/1994 | Matoba | |
| 5,360,653 A | 11/1994 | Ackley | |
| 5,362,046 A | 11/1994 | Sims | |
| 5,377,979 A | 1/1995 | Long | |
| 5,379,208 A | 1/1995 | Shinozaki | |
| 5,384,083 A | 1/1995 | Dawn | |
| 5,395,108 A | 3/1995 | Souders | |
| 5,423,087 A * | 6/1995 | Krent | A41D 31/285 |
| | | | 2/463 |
| 5,435,549 A | 7/1995 | Chen | |
| 5,437,064 A | 8/1995 | Hamaguchi | |
| D364,496 S | 11/1995 | Lejuez | |
| 5,463,824 A | 11/1995 | Barna | |
| 5,503,879 A | 4/1996 | Cochran | |
| 5,511,777 A | 4/1996 | McNeely | |
| 5,515,546 A | 5/1996 | Shifrin | |
| 5,516,101 A | 5/1996 | Peng | |
| 5,517,691 A | 5/1996 | Blake | |
| 5,519,895 A | 5/1996 | Barnes, Jr. | |
| 5,524,885 A | 6/1996 | Heo | |
| 5,528,842 A | 6/1996 | Ricci | |
| 5,540,982 A | 7/1996 | Scholz | |
| 5,543,194 A | 8/1996 | Rudy | |
| 5,547,189 A | 8/1996 | Billings | |
| 5,560,985 A | 10/1996 | Watanabe | |
| 5,566,395 A | 10/1996 | Nebeker | |
| 5,575,473 A | 11/1996 | Turner | |
| 5,580,651 A | 12/1996 | Kerman | |
| 5,587,239 A | 12/1996 | Ueba | |
| 5,593,158 A | 1/1997 | Filice | |
| 5,598,588 A | 2/1997 | Lee | |
| 5,603,117 A | 2/1997 | Hudner, Jr. | |
| 5,615,488 A | 4/1997 | Brady | |
| 5,621,914 A | 4/1997 | Ramone | |
| 5,624,114 A | 4/1997 | Kelsey | |
| D379,208 S | 5/1997 | Kulisek, Jr. | |
| 5,625,901 A | 5/1997 | Healy | |
| 5,636,377 A | 6/1997 | Wiener | |
| 5,653,543 A | 8/1997 | Abe | |
| 5,653,643 A | 8/1997 | Falone | |
| 5,655,975 A | 8/1997 | Nashif | |
| 5,657,985 A | 8/1997 | Dahlstroem | |
| 5,661,854 A | 9/1997 | March, II | |
| 5,666,670 A | 9/1997 | Ryan | |
| 5,673,437 A | 10/1997 | Chase | |
| 5,686,158 A | 11/1997 | Gibbon | |
| 5,695,408 A | 12/1997 | DeLaCruz | |
| 5,697,101 A * | 12/1997 | Aldridge | A41D 31/085 |
| | | | 2/81 |
| 5,701,611 A * | 12/1997 | Rector | A63B 71/12 |
| | | | 2/268 |
| 5,713,082 A | 2/1998 | Bassette | |
| 5,718,064 A | 2/1998 | Pyle | |
| 5,722,524 A | 3/1998 | Mizukami | |
| 5,725,487 A | 3/1998 | Freeman | |
| 5,729,830 A | 3/1998 | Luhtala | |
| 5,729,923 A | 3/1998 | Lin | |
| 5,730,662 A | 3/1998 | Rens | |
| 5,745,923 A | 5/1998 | Katz | |
| 5,749,798 A | 5/1998 | Kuebler | |
| 5,759,113 A | 6/1998 | Lai | |
| 5,772,524 A | 6/1998 | Huang | |
| 5,789,327 A | 8/1998 | Rousseau | |
| 5,797,192 A | 8/1998 | Curtis | |
| 5,815,847 A | 10/1998 | Holden, Jr. | |
| 5,840,397 A | 11/1998 | Landi | |
| 5,842,933 A | 12/1998 | Lewis | |
| 5,843,851 A | 12/1998 | Cochran | |
| 5,858,521 A | 1/1999 | Okuda | |
| 5,870,282 A | 2/1999 | Andre | |
| 5,871,899 A | 2/1999 | Dickinson | |
| 5,887,289 A | 3/1999 | Theoret | |
| 5,896,584 A | 4/1999 | Hauser | |
| 5,901,468 A | 5/1999 | Whyte | |
| D410,768 S | 6/1999 | Hirsh | |
| 5,912,195 A | 6/1999 | Walla | |
| 5,913,412 A | 6/1999 | Huber | |
| 5,915,537 A | 6/1999 | Dallas | |
| 5,915,538 A | 6/1999 | Basson | |
| 5,916,664 A | 6/1999 | Rudy | |
| 5,926,847 A | 7/1999 | Eibert | |
| 5,944,617 A | 8/1999 | Falone | |
| 5,946,734 A | 9/1999 | Vogan | |
| 5,963,969 A | 10/1999 | Tidwell | |
| 5,963,989 A | 10/1999 | Robertson | |
| 5,979,081 A | 11/1999 | Vaz | |
| 5,987,649 A | 11/1999 | Robertson | |
| 5,996,126 A | 12/1999 | Barthold | |
| 6,000,062 A | 12/1999 | Trakh | |
| 6,007,439 A | 12/1999 | MacKay, Jr. | |

(56) References Cited

U.S. PATENT DOCUMENTS

| | | | |
|---|---|---|---|
| 6,007,793 A | 12/1999 | Bhatt | |
| 6,030,355 A | 2/2000 | Callinan | |
| 6,060,408 A | 5/2000 | Monica | |
| 6,062,143 A | 5/2000 | Grace | |
| 6,073,271 A | 6/2000 | Alexander | |
| 6,073,272 A | 6/2000 | Ball | |
| 6,074,954 A | 6/2000 | Lill | |
| 6,074,965 A | 6/2000 | Bodenschatz | |
| 6,077,793 A | 6/2000 | Hatjasalo | |
| 6,081,929 A | 7/2000 | Rothrock | |
| 6,093,468 A | 7/2000 | Toms | |
| 6,094,750 A | 8/2000 | Lee | |
| D431,329 S | 9/2000 | Chen | |
| 6,138,283 A | 10/2000 | Kress | |
| 6,154,889 A | 12/2000 | Moore, III | |
| 6,167,639 B1 | 1/2001 | Ventura | |
| 6,182,299 B1 | 2/2001 | Chen | |
| 6,216,276 B1 | 4/2001 | Eibert | |
| 6,219,850 B1 | 4/2001 | Halstead | |
| 6,219,940 B1 | 4/2001 | Kita | |
| 6,231,946 B1 | 5/2001 | Brown, Jr. | |
| 6,240,571 B1 | 6/2001 | Infusino | |
| 6,243,879 B1 | 6/2001 | Lyden | |
| 6,251,493 B1 | 6/2001 | Johnson | |
| 6,256,798 B1 | 7/2001 | Egolf | |
| 6,256,799 B1 | 7/2001 | McGlasson | |
| 6,272,758 B1 | 8/2001 | Wheeler | |
| 6,282,724 B1 | 9/2001 | Abraham | |
| 6,295,654 B1 * | 10/2001 | Farrell | A41D 13/0158 |
| | | | 2/108 |
| 6,298,497 B1 | 10/2001 | Chartrand | |
| 6,301,719 B1 | 10/2001 | Goodhand | |
| 6,301,722 B1 | 10/2001 | Nickerson | |
| 6,303,221 B1 | 10/2001 | Prior | |
| 6,318,001 B1 | 11/2001 | Lee | |
| 6,318,002 B1 | 11/2001 | Ou | |
| 6,324,700 B1 | 12/2001 | McDougall | |
| 6,340,080 B1 | 1/2002 | Carlson | |
| 6,349,416 B1 | 2/2002 | Lampe | |
| 6,360,376 B1 | 3/2002 | Carrington | |
| 6,367,090 B1 | 4/2002 | Im | |
| 6,368,989 B1 | 4/2002 | Pascual | |
| 6,370,697 B1 | 4/2002 | Held | |
| 6,374,423 B1 | 4/2002 | Anderson | |
| 6,381,759 B1 | 5/2002 | Katz | |
| 6,385,780 B1 | 5/2002 | Racine | |
| 6,389,607 B1 | 5/2002 | Wood | |
| 6,399,903 B1 | 6/2002 | Stevenson | |
| 6,416,432 B1 | 7/2002 | Rosen | |
| 6,418,564 B1 | 7/2002 | Sheridan | |
| 6,434,755 B1 | 8/2002 | Halstead | |
| 6,453,476 B1 | 9/2002 | Moore | |
| 6,505,421 B1 | 1/2003 | Vaz | |
| 6,511,927 B1 | 1/2003 | Ellis | |
| 6,519,781 B1 | 2/2003 | Berns | |
| 6,520,491 B2 | 2/2003 | Timlick | |
| 6,544,910 B2 | 4/2003 | Himmelsbach | |
| 6,550,071 B2 | 4/2003 | Garneau | |
| 6,558,270 B2 | 5/2003 | Kwitek | |
| 6,558,570 B2 | 5/2003 | Alwan | |
| 6,578,836 B2 | 6/2003 | Kogure | |
| 6,586,110 B1 | 7/2003 | Obeshaw | |
| D479,020 S | 8/2003 | Heinrich | |
| 6,610,618 B1 | 8/2003 | Bottger | |
| 6,625,905 B2 | 9/2003 | Kita | |
| 6,647,556 B2 | 11/2003 | Grepper | |
| 6,652,366 B2 | 11/2003 | Dyer | |
| 6,652,398 B2 | 11/2003 | Falone | |
| 6,694,529 B1 | 2/2004 | Chiu | |
| 6,723,401 B1 | 4/2004 | McKnight | |
| 6,751,808 B2 | 6/2004 | Puchalski | |
| 6,775,851 B1 | 8/2004 | Chen | |
| 6,872,157 B2 | 3/2005 | Falone | |
| 6,880,269 B2 | 4/2005 | Falone | |
| 6,883,181 B2 | 4/2005 | Long | |
| 6,928,658 B2 | 8/2005 | Taira | |
| 6,944,974 B2 | 9/2005 | Falone | |
| 6,969,548 B1 | 11/2005 | Goldfine | |
| 6,996,856 B2 | 2/2006 | Puchalski | |
| 7,010,814 B2 | 3/2006 | Benziger | |
| 7,096,512 B2 | 8/2006 | Blair | |
| 7,150,113 B2 | 12/2006 | Vito | |
| 7,159,249 B2 | 1/2007 | Dennis | |
| 7,171,697 B2 | 2/2007 | Vito | |
| 7,207,962 B2 | 4/2007 | Anand | |
| 7,285,505 B2 | 10/2007 | Callaway | |
| D556,951 S | 12/2007 | Gath | |
| D577,866 S | 9/2008 | Frye | |
| D582,607 S | 12/2008 | Ferrara | |
| 7,475,434 B2 | 1/2009 | Ambuske | |
| D592,380 S | 5/2009 | McLaughlin | |
| D604,461 S | 11/2009 | Goldman | |
| D612,545 S | 3/2010 | Pliszka | |
| 7,673,350 B2 | 3/2010 | Mazzoccoli | |
| D617,503 S | 6/2010 | Szalkowski | |
| 7,765,622 B2 | 8/2010 | Wiles | |
| D637,356 S | 5/2011 | Green | |
| 7,950,073 B2 | 5/2011 | Ferrara | |
| D640,422 S | 6/2011 | Green | |
| 7,958,570 B1 | 6/2011 | Mooney | |
| 7,958,573 B2 | 6/2011 | Lewis, Jr. | |
| 8,001,622 B1 | 8/2011 | Culley | |
| 8,001,624 B1 | 8/2011 | Leedom | |
| 8,042,198 B1 | 10/2011 | Cleveland | |
| 8,046,845 B1 | 11/2011 | Garcia | |
| 8,087,099 B2 | 1/2012 | Sawabe | |
| 8,095,995 B2 | 1/2012 | Alexander | |
| 8,108,824 B2 | 1/2012 | Kotani | |
| 8,146,178 B2 | 4/2012 | Maddux | |
| 8,156,574 B2 | 4/2012 | Stokes | |
| D660,519 S | 5/2012 | Laloy | |
| 8,196,226 B1 | 6/2012 | Schuh | |
| 8,205,272 B2 | 6/2012 | Green | |
| D663,076 S | 7/2012 | Parsons | |
| D663,901 S | 7/2012 | Vito | |
| D666,779 S | 9/2012 | Harris | |
| D667,592 S | 9/2012 | Vito | |
| D670,868 S | 11/2012 | Harris | |
| D670,869 S | 11/2012 | Harris | |
| D670,870 S | 11/2012 | Harris | |
| D671,270 S | 11/2012 | Ho | |
| D671,271 S | 11/2012 | Votel | |
| D687,215 S | 8/2013 | Padgett | |
| 8,505,113 B2 | 8/2013 | Crye | |
| 8,505,122 B1 * | 8/2013 | Green | A41D 13/0156 |
| | | | 2/463 |
| 8,534,279 B2 | 9/2013 | Brace | |
| 8,544,118 B2 | 10/2013 | Brine, III | |
| 8,545,966 B2 | 10/2013 | Vito | |
| 8,572,767 B2 | 11/2013 | Bryant | |
| D695,966 S | 12/2013 | Futterer | |
| D697,267 S | 1/2014 | Benvegnu | |
| 8,640,267 B1 | 2/2014 | Cohen | |
| D701,348 S | 3/2014 | Thurgood | |
| 8,739,316 B1 | 6/2014 | Norton | |
| 8,776,273 B2 | 7/2014 | Krause | |
| 8,789,212 B2 | 7/2014 | Cleva | |
| 8,850,622 B2 | 10/2014 | Finiel | |
| 8,898,819 B2 | 12/2014 | Cleva | |
| D724,294 S | 3/2015 | Vito | |
| 8,978,167 B2 | 3/2015 | Blair | |
| 8,997,267 B2 | 4/2015 | Skottheim | |
| 9,131,744 B2 | 9/2015 | Erb | |
| 9,155,924 B1 | 10/2015 | Grove | |
| D744,168 S * | 11/2015 | Best | D29/101.3 |
| D745,255 S | 12/2015 | Boynton | |
| D749,272 S | 2/2016 | Vito | |
| D754,930 S | 4/2016 | Vito | |
| 9,364,039 B2 | 6/2016 | Pusateri | |
| 9,414,636 B2 | 8/2016 | Pietrzak | |
| D769,541 S | 10/2016 | Meier | |
| 9,474,318 B2 | 10/2016 | Wesson | |
| 9,504,059 B2 | 11/2016 | Belchoul | |
| 9,526,291 B2 | 12/2016 | Beauchamp | |

(56) References Cited

U.S. PATENT DOCUMENTS

| | | |
|---|---|---|
| 9,842,409 B2 | 12/2017 | Kuwahara |
| 9,861,153 B2 | 1/2018 | Finisdore |
| D812,313 S | 3/2018 | Williams |
| 9,907,347 B2 | 3/2018 | Allen |
| 10,092,056 B2 | 10/2018 | Durocher |
| 10,357,077 B2 | 7/2019 | Pietrzak |
| 10,362,829 B2 | 7/2019 | Lowe |
| D867,672 S | 11/2019 | Votel |
| 10,779,599 B2 | 9/2020 | Votel |
| D903,947 S | 12/2020 | Pietruck |
| 2001/0008053 A1 | 7/2001 | Belli |
| 2001/0055994 A1 | 12/2001 | Kwitek |
| 2002/0000004 A1 | 1/2002 | Wise |
| 2002/0002730 A1 | 1/2002 | Dennis |
| 2002/0007508 A1 | 1/2002 | Grepper |
| 2002/0023290 A1 | 2/2002 | Watters |
| 2002/0026664 A1 | 3/2002 | Grounds |
| 2002/0028325 A1* | 3/2002 | Simpson ............... B32B 27/40 |
| | | 428/218 |
| 2002/0035748 A1 | 3/2002 | Racine |
| 2002/0095804 A1 | 7/2002 | Coplan |
| 2002/0110666 A1 | 8/2002 | McCollough |
| 2002/0114959 A1 | 8/2002 | Kang |
| 2002/0138896 A1 | 10/2002 | Holden |
| 2002/0144432 A1 | 10/2002 | Dennis |
| 2002/0152542 A1 | 10/2002 | Dennis |
| 2002/0162542 A1 | 11/2002 | Dutart |
| 2002/0193459 A1 | 12/2002 | Haseyama |
| 2003/0035962 A1 | 2/2003 | Wang |
| 2003/0040384 A1 | 2/2003 | Falone |
| 2003/0070209 A1* | 4/2003 | Falone ................... A43B 19/00 |
| | | 2/463 |
| 2003/0140400 A1* | 7/2003 | Ho ........................ A42B 3/063 |
| | | 2/412 |
| 2003/0140512 A1 | 7/2003 | Jevons |
| 2003/0167558 A1 | 9/2003 | Broersma |
| 2003/0167560 A1* | 9/2003 | LaShoto .............. A41D 13/015 |
| | | 2/463 |
| 2003/0228816 A1 | 12/2003 | Vito |
| 2003/0228819 A1 | 12/2003 | Vito |
| 2004/0034903 A1 | 2/2004 | Blair |
| 2004/0048701 A1 | 3/2004 | Falone |
| 2004/0055994 A1 | 3/2004 | Miwa |
| 2004/0107482 A1 | 6/2004 | Picotte |
| 2004/0109992 A1 | 6/2004 | Gribble |
| 2004/0168355 A1 | 9/2004 | Biwand |
| 2004/0172739 A1 | 9/2004 | Racine |
| 2004/0181854 A1 | 9/2004 | Primrose |
| 2004/0226077 A1 | 11/2004 | Toth |
| 2004/0263555 A1 | 12/2004 | Silverbrook |
| 2005/0034223 A1 | 2/2005 | Durocher |
| 2005/0037189 A1 | 2/2005 | Palmer |
| 2005/0060908 A1 | 3/2005 | Vito |
| 2005/0081277 A1 | 4/2005 | Matechen |
| 2005/0114985 A1 | 6/2005 | Falone |
| 2005/0132614 A1 | 6/2005 | Brennan |
| 2005/0144808 A1 | 7/2005 | Vito |
| 2005/0155302 A1 | 7/2005 | Holwerda |
| 2005/0166302 A1 | 8/2005 | Dennis |
| 2005/0241052 A1* | 11/2005 | Brown ............... A41D 13/0153 |
| | | 2/463 |
| 2005/0251899 A1 | 11/2005 | Dennis |
| 2005/0257312 A1 | 11/2005 | Puchalski |
| 2005/0266748 A1 | 12/2005 | Wagner |
| 2005/0268383 A1 | 12/2005 | Harris |
| 2006/0000009 A1 | 1/2006 | Fleming |
| 2006/0010579 A1 | 1/2006 | Wiles |
| 2006/0048292 A1* | 3/2006 | Gillen ............... A41D 13/0153 |
| | | 2/456 |
| 2006/0059605 A1 | 3/2006 | Ferrara |
| 2006/0080762 A1* | 4/2006 | Kobren ............. A41D 13/0518 |
| | | 2/463 |
| 2006/0096000 A1* | 5/2006 | Romero ............. A41D 13/0568 |
| | | 2/22 |
| 2006/0096011 A1 | 5/2006 | Dennis |
| 2006/0107433 A1* | 5/2006 | Olson .................... A63B 71/08 |
| | | 2/22 |
| 2006/0112477 A1 | 6/2006 | Schneider |
| 2006/0143807 A1 | 7/2006 | Udelhofen |
| 2006/0157901 A1 | 7/2006 | Vito |
| 2006/0168710 A1 | 8/2006 | Vito |
| 2006/0168712 A1 | 8/2006 | Mazzoccoli |
| 2006/0260026 A1 | 11/2006 | Doria |
| 2007/0050886 A1* | 3/2007 | Brassill .................. A63B 71/12 |
| | | 2/115 |
| 2007/0102461 A1* | 5/2007 | Carstens ............... A41D 13/005 |
| | | 224/222 |
| 2007/0130670 A1 | 6/2007 | Henf |
| 2007/0130673 A1 | 6/2007 | Wasserkrug |
| 2007/0149079 A1 | 6/2007 | Vito |
| 2007/0157370 A1 | 7/2007 | Joubert Des Ouches |
| 2007/0163031 A1 | 7/2007 | Lewis |
| 2007/0174953 A1* | 8/2007 | Garneau ................. A41D 1/084 |
| | | 2/466 |
| 2008/0066217 A1* | 3/2008 | Depreitere ............. A42B 3/124 |
| | | 2/412 |
| 2008/0092279 A1 | 4/2008 | Chiang |
| 2008/0113143 A1* | 5/2008 | Taylor .................... B32B 5/245 |
| | | 428/47 |
| 2008/0172779 A1* | 7/2008 | Ferguson ............. A41D 31/285 |
| | | 2/455 |
| 2008/0178371 A1 | 7/2008 | Landi |
| 2008/0201828 A1* | 8/2008 | Kanavage ............ A41D 13/015 |
| | | 2/463 |
| 2008/0235855 A1* | 10/2008 | Kobren ............. A41D 13/0518 |
| | | 2/463 |
| 2009/0083890 A1 | 4/2009 | Dempsey |
| 2009/0106882 A1 | 4/2009 | Nimmons |
| 2009/0158506 A1 | 6/2009 | Thompson |
| 2009/0211001 A1* | 8/2009 | Weimer ................. A63B 71/12 |
| | | 2/463 |
| 2009/0222964 A1 | 9/2009 | Wiles |
| 2009/0276943 A1* | 11/2009 | Balolia ................... A41D 13/05 |
| | | 2/455 |
| 2009/0307829 A1* | 12/2009 | Onrot ................ A41D 13/0506 |
| | | 2/400 |
| 2010/0037374 A1* | 2/2010 | Crelinsten .............. A41D 13/05 |
| | | 2/455 |
| 2010/0173124 A1 | 7/2010 | Liu |
| 2010/0258988 A1 | 10/2010 | Darnell |
| 2010/0306904 A1 | 12/2010 | Neid |
| 2010/0306907 A1* | 12/2010 | Fiegener ................ A63B 71/12 |
| | | 2/113 |
| 2011/0005379 A1* | 1/2011 | Wang .................... F41H 5/0471 |
| | | 89/914 |
| 2011/0047679 A1 | 3/2011 | Rogers |
| 2011/0047680 A1 | 3/2011 | Hoying |
| 2011/0113533 A1 | 5/2011 | Guillen |
| 2011/0207997 A1 | 8/2011 | Greenburg |
| 2011/0219524 A1* | 9/2011 | Perreault ........... A41D 13/0518 |
| | | 2/463 |
| 2011/0252549 A1* | 10/2011 | Jourde .............. A41D 13/0518 |
| | | 2/463 |
| 2011/0302700 A1 | 12/2011 | Vito |
| 2011/0307997 A1 | 12/2011 | Blair |
| 2011/0314589 A1* | 12/2011 | Vito ....................... F16F 1/3737 |
| | | 2/181 |
| 2012/0000011 A1 | 1/2012 | Grewall |
| 2012/0036620 A1* | 2/2012 | Harris .................... A42B 3/127 |
| | | 2/414 |
| 2012/0060268 A1* | 3/2012 | Crelinsten .............. A41D 13/05 |
| | | 2/463 |
| 2012/0204327 A1 | 8/2012 | Faden |
| 2012/0210488 A1* | 8/2012 | Blakely ............. A41D 13/0015 |
| | | 2/69 |
| 2012/0246788 A1* | 10/2012 | Harrell ............... A41D 13/0155 |
| | | 2/243.1 |
| 2012/0317705 A1 | 12/2012 | Lindsay |
| 2013/0000017 A1 | 1/2013 | Szalkowski |
| 2013/0000024 A1* | 1/2013 | Perreault ........... A41D 13/0568 |
| | | 2/463 |

(56) References Cited

U.S. PATENT DOCUMENTS

| | | | |
|---|---|---|---|
| 2013/0014318 A1 | 1/2013 | Jourde | |
| 2013/0302569 A1 | 11/2013 | Vito | |
| 2013/0305439 A1* | 11/2013 | Contant | A41D 13/0153 2/455 |
| 2013/0340146 A1 | 12/2013 | Dekker | |
| 2014/0000016 A1* | 1/2014 | Storelli | A41D 13/0518 2/463 |
| 2014/0020158 A1 | 1/2014 | Parsons | |
| 2014/0143939 A1* | 5/2014 | Olivares Velasco | A41D 31/125 2/414 |
| 2014/0201889 A1 | 7/2014 | Pietrzak | |
| 2014/0223644 A1 | 8/2014 | Bologna | |
| 2014/0230133 A1 | 8/2014 | Roberts | |
| 2014/0245525 A1* | 9/2014 | Turner | A42B 3/125 2/455 |
| 2014/0325745 A1 | 11/2014 | Erb | |
| 2014/0338104 A1 | 11/2014 | Vito | |
| 2015/0000015 A1 | 1/2015 | Beauchamp | |
| 2015/0013050 A1 | 1/2015 | Floyd, Jr. | |
| 2015/0089726 A1 | 4/2015 | Long | |
| 2015/0181950 A1 | 7/2015 | Skottheim | |
| 2015/0223547 A1* | 8/2015 | Wibby | A42B 3/064 2/414 |
| 2015/0245621 A1 | 9/2015 | Stewart | |
| 2015/0264993 A1 | 9/2015 | Vito | |
| 2015/0282550 A1 | 10/2015 | Musal | |
| 2015/0305423 A1 | 10/2015 | Pusateri | |
| 2015/0374059 A1 | 12/2015 | Farquhar | |
| 2016/0037885 A1 | 2/2016 | Vito | |
| 2017/0105461 A1 | 4/2017 | Hancock | |
| 2017/0151486 A1* | 6/2017 | Liang | A41D 31/285 |
| 2017/0224042 A1 | 8/2017 | Abraham | |
| 2017/0273388 A1 | 9/2017 | Vito | |
| 2017/0280811 A1 | 10/2017 | Finisdore | |
| 2017/0311659 A1 | 11/2017 | Guidetti | |
| 2017/0340045 A1 | 11/2017 | Pickett | |
| 2018/0049508 A1 | 2/2018 | Terry | |
| 2019/0090573 A1 | 3/2019 | Votel | |
| 2019/0314707 A1* | 10/2019 | Lemieux | A41D 13/0562 |
| 2020/0121018 A1 | 4/2020 | Desjardins | |
| 2020/0205491 A1* | 7/2020 | Melofchik | A41D 13/0568 |

FOREIGN PATENT DOCUMENTS

| | | |
|---|---|---|
| CN | 101065168 A | 10/2007 |
| CN | 104244755 A | 12/2014 |
| DE | 508419 T2 | 9/1930 |
| DE | 2210205 | 3/1973 |
| DE | 2805314 | 8/1979 |
| DE | 8715697 T2 | 2/1988 |
| DE | 8804821 U1 | 6/1988 |
| DE | 9312305 | 10/1993 |
| DE | 9312305 U1 | 10/1993 |
| DE | 29605144 U1 | 5/1996 |
| DE | 202004012916 U1 | 12/2004 |
| DE | 202006018653 U1 | 4/2007 |
| DE | 102006058782 A1 | 6/2008 |
| EP | 0217996 A1 | 4/1987 |
| EP | 0374597 A2 | 6/1990 |
| EP | 0623292 A1 | 11/1994 |
| EP | 0770338 A1 | 5/1997 |
| EP | 1136007 A2 | 9/2001 |
| FR | 2631667 A1 | 11/1989 |
| GB | 350142 | 6/1931 |
| GB | 458367 | 12/1936 |
| GB | 1190988 A | 5/1970 |
| GB | 2342845 A | 4/2000 |
| GB | 2453775 A | 4/2009 |
| JP | 57125730 | 8/1982 |
| JP | 067488 | 1/1994 |
| JP | 67488 A | 1/1994 |
| JP | H067488 | 1/1994 |
| JP | 8188677 A | 7/1996 |
| JP | H08188677 | 7/1996 |
| JP | 1193014 A | 4/1999 |
| JP | 11221104 A | 8/1999 |
| JP | 11286822 A | 10/1999 |
| JP | 2001073218 A | 3/2001 |
| JP | 3085544 | 5/2002 |
| JP | 3085544 U | 5/2002 |
| JP | 2005504568 | 2/2005 |
| JP | 2006124896 T2 | 5/2006 |
| JP | 2007023453 T2 | 2/2007 |
| JP | 2007056397 | 3/2007 |
| JP | 3154479 U | 10/2009 |
| JP | 2010189820 | 9/2010 |
| JP | 5575629 | 8/2014 |
| JP | 2017150126 A | 8/2017 |
| KR | 20000022092 A | 4/2000 |
| KR | 200456037 Y1 | 10/2011 |
| KR | 20130025534 A | 3/2013 |
| KR | 20130104004 A | 9/2013 |
| TW | 557685 U | 10/2003 |
| TW | I234473 B | 6/2005 |
| WO | 9100966 A | 1/1991 |
| WO | 9846095 A2 | 10/1998 |
| WO | 9913004 A1 | 3/1999 |
| WO | 0035307 A1 | 6/2000 |
| WO | 0124651 A1 | 4/2001 |
| WO | 0185863 A1 | 11/2001 |
| WO | 03005843 A1 | 1/2003 |
| WO | 03018144 A1 | 3/2003 |
| WO | 03032762 A2 | 4/2003 |
| WO | 03066174 A | 8/2003 |
| WO | 03103949 A1 | 12/2003 |
| WO | 2004016122 A1 | 2/2004 |
| WO | 2005027671 A1 | 3/2005 |
| WO | 2006007499 | 1/2006 |
| WO | 2007054074 | 5/2007 |
| WO | 2007067405 A1 | 6/2007 |
| WO | 2012074400 A1 | 6/2012 |
| WO | 2013068708 A1 | 5/2013 |
| WO | 2016112987 A1 | 7/2016 |
| WO | 2016196724 A1 | 12/2016 |
| WO | 2017006078 A1 | 1/2017 |
| WO | 2007054074 A2 | 5/2017 |

OTHER PUBLICATIONS

"Position Statement on Commotio Cordis", US Lacrosse, 2016, 4 pages, http://www.uslacrosse.org/safety/sudden-cardiac-arrest-aeds-commotio-cordis/position-statement-on-commotio-cordis.

"V. Angiology. 4b. The Heart. Gray, Henry. 1918. Anatomy of the Human Body", Henry Gray (1821-1865). Anatomy of the Human Body. 1918. https://www.bartleby.com/107/138.html.

Brookman, "PVC Thermoplastic Elastomers", Journal of Vinyl Technology, vol. 10, Issue 1, 1988, pp. 33-36. Abstract Only.

Development of a Chest Wall Protector Effective in Preventing Sudden Cardiac Death by Ghest Wall Impact (Commotio Cordis); Kartik Kumar, MBBS, Swati N. Mandeywala, MBBS, Michael P. Gannon, MD, Nathan Anthony Mark Estes III, MD, Jonathan Weinstock, MD, and Mark S. Link, MD; www.cjsportmed.com, vol. 0, No. 0, Month 2016, 5 pages.

Failure of Commercially Available Chest Wall Protectors to Prevent Sudden Cardiacdeath Induced by Chest Wall Blows in an Experimental Model of Commotio Cordis, Jonathan Weinstock, MD, Barry J. Maron, MD, Christopher Song, BA, Paresh P. Mane, MD, N.A. Mark Estes, III, MD, Mark S. Link, MD; Cardiac Arrhythmia Center, Division of Cardiology, Department of Medicine, Tufts University School of Medicine, Tufts-New England Medical Center, Boston Massachusetts, Minneapolis Heart Institute Foundation, April.

International Preliminary Report on Patentability and Written Opinion issued for PCT/US2012/032669 dated Oct. 15, 2013. 9 pages.

International Preliminary Report on Patentability for PCT/US2012/040104 dated Dec. 10, 2013, 6 pages.

International Search Report and Written Opinion for PCT/US2013/058399 mailed Dec. 30, 2013. 13 pages.

(56) References Cited

OTHER PUBLICATIONS

IPER and Written Opinion issued in PCT/US2013/058396 dated Mar. 17, 2015. 13 pages.
IPER and Written Opinion issued in PCT/US2013/058399 dated Mar. 17, 2015. 10 pages.
Jared S. Hopkins, Chicago Tribune, Young athletes' chest protectors fail in risky hits; Article 2; https://digitaledition. chicagotribune.com/tribune/article_popover aspx?g . . . ; Jun. 20, 2022; pp. 1-6.
Office Action (Non-Final Rejection) dated Feb. 13, 2024 for U.S. Appl. No. 18/213,595 (pp. 1-32).
P.K. Daniel; Broken Hearts Stopping the Killer of Young Athletes; Nov. 29, 2012; https://la12.org/broken-hearts-stopping-the-killer-of-young-athletes; pp. 1-10.
Office Action (Non-Final Rejection) dated Sep. 9, 2024 for U.S. Appl. No. 18/213,603 (pp. 1-19).
Office Action (Notice of Allowance and Fees Due (PTOL-85)) dated Jul. 1, 2024 for U.S. Appl. No. 18/213,595 (pp. 1-7).
Office Action (Notice of Allowance and Fees Due (PTOL-85)) dated Jul. 17, 2024 for U.S. Appl. No. 18/213,595 (pp. 1-4).

\* cited by examiner

APPARATUSES, SYSTEMS AND METHODS FOR EQUIPMENT FOR PROTECTING THE HUMAN BODY BY ABSORBING AND DISSIPATING FORCES IMPARTED TO THE BODY

CROSS-REFERENCE TO RELATED APPLICATIONS

This application is a Continuation Application of U.S. application Ser. No. 15/383,770, filed Dec. 19, 2016, which claims priority to U.S. Provisional Patent Application No. 62/269,723, filed Dec. 18, 2015, which are hereby incorporated by reference as if set forth herein in their entirety.

BACKGROUND

Field of Disclosure

The present disclosure relates to equipment, and, more specifically, to apparatuses, systems and methods for equipment for protecting the human body by absorbing and dissipating forces imparted to the body.

Description of the Background

As will be understood to the skilled artisan, commotio cordis is a concussion of the heart. This cardiac concussion at a particular point in the cardiac cycle can cause cardiac arrest and lead to death, and the condition may be particularly dangerous for youths with more deformable sternums, such as youths under the age of 18. Moreover, youths may be particularly exposed during certain activities, such as during competitive sports play. Other internal organs, such as the liver, brain, kidneys, etc., may likewise be impacted by imparted forces similar to those that may cause commotio cordis.

Distressingly, commotio cordis, although rare, continues to occur, frequently in those wearing protective equipment known in the art. Baseball, lacrosse and hockey are three common sports in which commotio cordis occurs, and these are also sports in which chest-protective equipment is frequently worn by participants, including many of those (estimated to be as many as ⅓) that suffer commotio cordis.

Accordingly, improved apparatuses, systems and methods of protecting the human body by absorbing and dissipating forces imparted to the body are needed.

SUMMARY

The disclosed apparatus, system and method includes at least a protective garment that prevents concussive effects on internal organs. The garment many include a garment body; and, embedded in the garment body, at least one multi-sectional pad. At least two of the multi-sections may comprise: at least one aramid layer; at least one multi-durometer foam layer having a substantially similar surface area to that provided by the at least one aramid layer; and at least one shield layer.

Accordingly, the disclosure provides improved apparatuses, systems and methods of protecting the human body by absorbing and dissipating forces imparted to the body.

BRIEF DESCRIPTION OF THE DRAWINGS

The description herein is made in conjunction with the attached drawings, which form a part hereof, in which like numerals represent like elements, and in which.

DETAILED DESCRIPTION

Figure 1A:
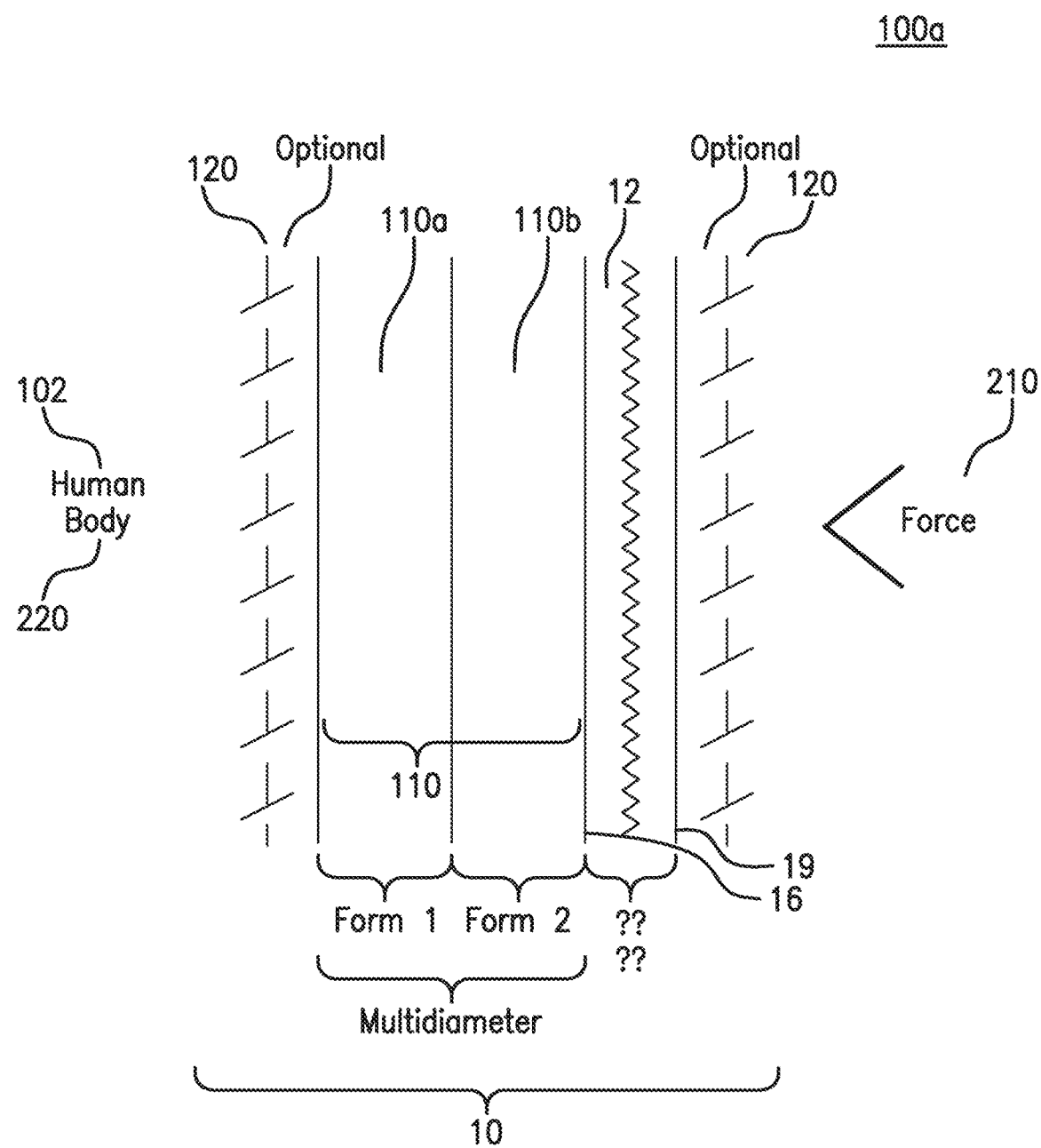
FIGS. 1A and 1B illustrate a multi-durometer protective pad.

The figures and descriptions provided herein may have been simplified to illustrate aspects that are relevant for a clear understanding of the herein described apparatuses, systems, and methods, while eliminating, for the purpose of clarity, other aspects that may be found in typical similar apparatuses, systems, and methods. Those of ordinary skill may thus recognize that other elements and/or operations may be desirable and/or necessary to implement the aspects described herein. But because such elements and operations are known in the art, and because they do not facilitate a better understanding of the present disclosure, a discussion of such elements and operations may not be provided herein. However, the present disclosure is deemed to nevertheless include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific aspects, apparatuses, elements, devices, and methods, to provide a thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to," "coupled to," or like terminology in relation to another element or layer, it may be directly on, engaged, connected or coupled to the other element or layer, or intervening elements or layers may be present. In contrast, when an element is referred to as being "directly on," "directly engaged to", "directly connected to," "directly coupled to" or like terminology in relation to another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments provide at least protective equipment, such as chest protectors, garments, such as shirts, and the like (which may be referred to by collective terms and phrases herein throughout) 10 that serve in the prevention of concussive effects on the heart 102, cardiopulmonary system 204, internal organs and other body parts, and the like, by a received force. The concussive effects prevented by the disclosed embodiments may owe the provided functionality to the variety of layers that constitute the protective equipment. These layers may have various constituents, various thicknesses, and may be provided in various combinations that may modify the performance of the protective equipment, but which are nevertheless covered by the disclosed embodiments. For example, although an aramid layer 12 discussed herein may experience enhanced performance by having applied thereto an elastomeric coating 14, 16 on both sides thereof, those of ordinary skill in the pertinent arts will appreciate in light of the discussion herein that such coatings may be provided on only one side of the aramid layer or may be provided by various optional elastomeric components, or elastomeric combination in combination with other constituents or features, such as protective randomly distributed nanofibers and the like.

More specifically, a pad, panel, or multiple pads or panels 100a, 100b, 100c . . . , in addition to other arrangements (which may be referred to by collective terms or phrases herein throughout), may be provided that comprise the aforementioned coated aramid layer or layers. These apparatuses, which may be hereinafter referred to collectively as panels 100a, 100b, 100c, may, for example, include other layers in addition to a coated aramid layer. For example, a multidurometer layer or layers 110, 110a, 110b, such as may be formed of different durometer foams or multiple layers of foam of differing durometer, may be provided in association with a coated aramid layer. By way of non-limiting example, optimized performance may be achieved through the use 110 of foam layer or layers having dual durometers, such as a high-density foam and low-density foam in combination. By way of example, a low-density foam aspect may have a density of twelve to thirty-two pounds per cubic foot and most particularly may have a density of twenty pounds per cubic foot, while a low-density foam may have a density of three to twelve pounds per cubic foot, and most particularly nine pounds per cubic foot. These multidensity foams may form a multidurometer layer 110 that may serve to dissipate a received concussive force 210, and which may, on a face of the protective pad the outermost foam layer, be physically associated with a coated aramid layer, which coated aramid layer 12 may be most or least proximate in the protective equipment to the body 220. This arrangement is illustrated in FIGS. 1A and 1B, wherein a nine-pound per cubic foot low-density foam forms the innermost layer 110a of a panel, a thirty-one pound per cubic foot high density foam forms a middle layer 110b of the protective equipment, and a coated aramid 12 having a coating of elastomeric 14, 16 on both sides thereof forms the outermost layer of the protective equipment.

TABLE 1

| Chest protector | Accelleron ® closed cell high density foam | Airilon ® closed cell low density soft foam | Open cell memory foam | TriDur ® | ImpacShield ®, - multilayer semi-rigid polypropylene polymer | No of Impacts | No of VF | VF (%) |
|---|---|---|---|---|---|---|---|---|
| Control |  |  |  |  |  | 80 | 43 | 54 |
| 1 | 6 |  |  | .35 | .33 | 33 | 11 | 33 |
| 3 | 6 |  |  | .35 |  | 33 | 18 | 54 |
| 6 | 10 | 8 |  | .35 | .33 | 25 | 2 | 8 |
| 7 | 6 | 6 |  | .35 | .33 | 25 | 5 | 20 |
| 8 | 10 | 10 |  | .35 | .33 | 20 | 4 | 20 |
| 9 | 10 | 10 |  | .35 | .67 | 20 | 1 | 5 |
| 10 |  |  | 12 | .35 |  | 20 | 10 | 50 |
| 11 |  |  | 12 | .35 | .33 | 15 | 9 | 60 |
| 12 |  |  | 12 | .35 |  | 15 | 6 | 40 |
| 13 | 6 |  | 8 | .35 | .33 | 15 | 9 | 60 |
| 14 | 10 |  | 10 | .35 | .33 | 12 | 4 | 33 |
| 15 | 10 |  | 10 | .35 | .67 | 12 | 5 | 42 |

Figure 1B:
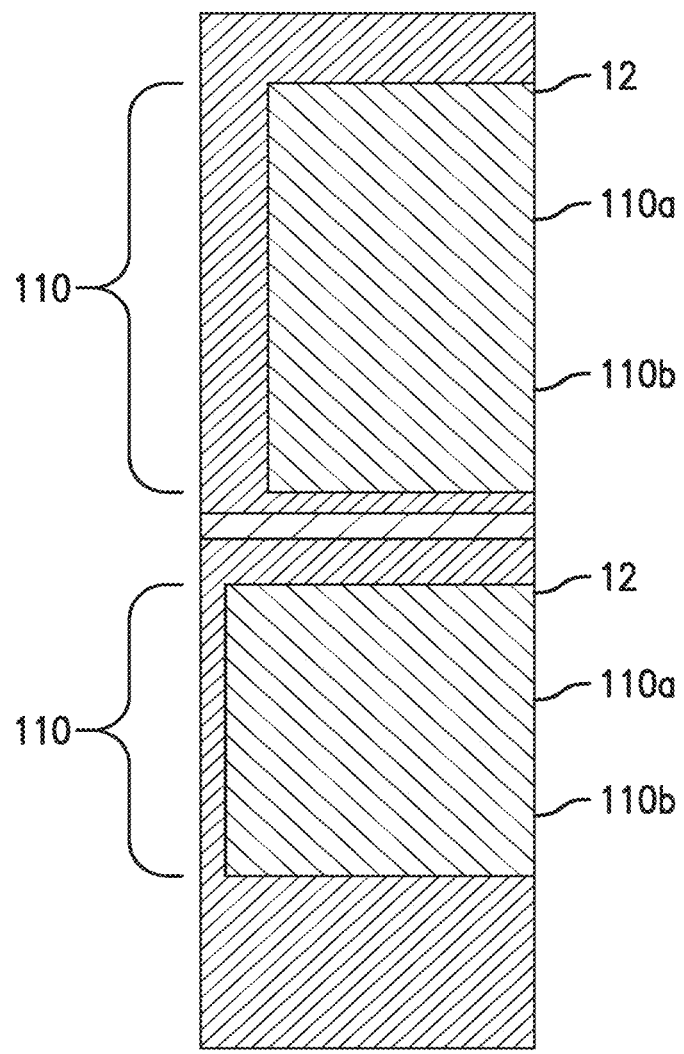

As referenced above, and as illustrated in Table 1, the arrangement of FIGS. 1A and 1B may have the various layers thereof formed of different thicknesses and weights. By way of non-eliminating example, the multidurometer foam layer discussed herein may provide an eighty-four percent effective reduction in forces at a combined thickness of one-half inch, a ninety-percent effective reduction in forces at a combined thickness of three-quarters of an inch, and a ninety-five percent reduction at a combined thickness of one inch. Moreover, the coating thickness on the aramid layer may vary in order to effectuate variations in performance, such as in the range of 1-3 ounces, such as 2.2 ounces, per square yard of aramid material.

Additionally, other layers beyond those illustrated in FIGS. 1A and 1B, or those optionally illustrated in FIGS. 1A and 1B, may be included. For example, additional shielding 120 may be provided at the innermost layer of a panel closest to the body, or at the outmost layer closest to the received force, in order to further shield the body from the received force. Such additional shielding 120 may, by way of non-limiting example, comprise a single or multilayer semi-rigid or rigid polypropylene polymer. This additional layer may have a thickness, by way of non-limiting example, in the range of 0.20-1 mm, and more particularly in the range of 0.35-0.67 mm.

Yet further, the thicknesses of layers independently, as well as in combination, may be varied in certain circumstances. For example, protective equipment having panels inclusive of a multi-durometer layer, may, in certain environments, preferably have minimal thickness. For example, in the event a panel is to be inserted into a helmet, such as in a pliable helmet insert, the desired total thickness of the embodiment described in FIGS. 1A and 1B may be approximately four millimeters, or more preferably, in the range of three millimeters to six millimeters.

Because the disclosed embodiments may provide multi-durometer layers, such as including high-density and low-density foams, in which may correspondingly comprise high durometer and low durometer foams, energy absorption of the provided panels is optimized. This is distinctly contrary to the known art, wherein only low-density/low durometer foam is employed in order to provide maximum comfort. However, because of the high level of deformation suffered by low-density foam, equipment employing only low-density foam compresses so significantly at impact that it does little prevent concussive effect on the body. Contrary to the known art, the disclosed embodiments provide significant comfort even including the use of a high-durometer, such as a four durometer foam, such as in the six to nine pound per cubic foot density range, in part because the high-durometer foam is used in combination with the low-durometer foam such that the thickness of the high-durometer foam is minimized. That is, the disclosed embodiments provide appreciably improved performance through the use of combination of foam densities, i.e., optimal performance is achieved by combining foams of different densities.

Moreover, certain of the layers provided in association with the disclosed protective equipment may have preferred characteristics due to the nature of the remaining layers. By way of non-eliminating example, coating layers provided over the aramid portions specifically may be colored, due to the damage that light can inflict on aramid performance. Yet further, the presence of particular layers may indicate the non-presence of other layers. For example, multiple high-density foam layers may be operationally less desirable than a multi-durometer layer disclosed herein, such as because only single or singular frequencies of impact force may be eliminated by multiple layers having similar or the same uniformity. Further, overly thick coating layers in association with the aramid layer, and/or multiple aramid layers, may be undesirable because forces to be dissipated are instead trapped between layers and allowed to oscillate rather than dissipate. Still further, the order of particular layers in the protective equipment discussed herein may indicate the placement or order of other layers. For example, performance may be degraded significantly if the coated aramid layer is placed in the outermost portion, i.e., most adjacent to the impact, of the disclosed panels.

In a method of selecting the make-up of a multi-layer, multidurometer material that may include multiple layers of foam with different durometers, a coated aramid layer, and optionally a rigid polyurethane layer, the selection of the durometers and thicknesses of the foam and aramid layers may be in a manner that effectively dissipates a broad spectrum of frequencies of received force. Or, the durometers or thicknesses of the foams and the aramid layer may be selected to dissipate a specific range of frequencies of received force.

Those skilled in the art will appreciate that various different aramids may be employed based upon the desired protective effects. For example, KEVLAR® K49 may be employed to optimize vibration absorption; K79 may be employed to minimize stabbing forces; and K29 and K129 may be provided to maximize protection again point impact or ballistics forces.

Those skilled in the art will appreciate various particular embodiments that may be indicated by the aspects discussed herein. For example, the disclosed protective equipment may be or may be included in an athletic shirt 208a, which may be lightweight and/or have wicking properties, and wherein such wicking properties do not adversely affect the performance of the aramid layer, at least in part due to the presence of the coating on the aramid layer; the protective equipment may comprise an athletic chest protector 208b, such as may be used in lacrosse, cricket, baseball, football, soccer, softball, or the like; or the protective equipment may be provided as a wearable harness, such as through the use of VELCRO® straps or the like. The protective aspects may be stitched into equipment 208 or garments 208, inserted into pre-formed pouches, or otherwise integrated with wearable items. The protective equipment may further be utilized in athletic helmets or headbands, such as for example baseball, football, soccer, lacrosse, or the like.

Figure 2:
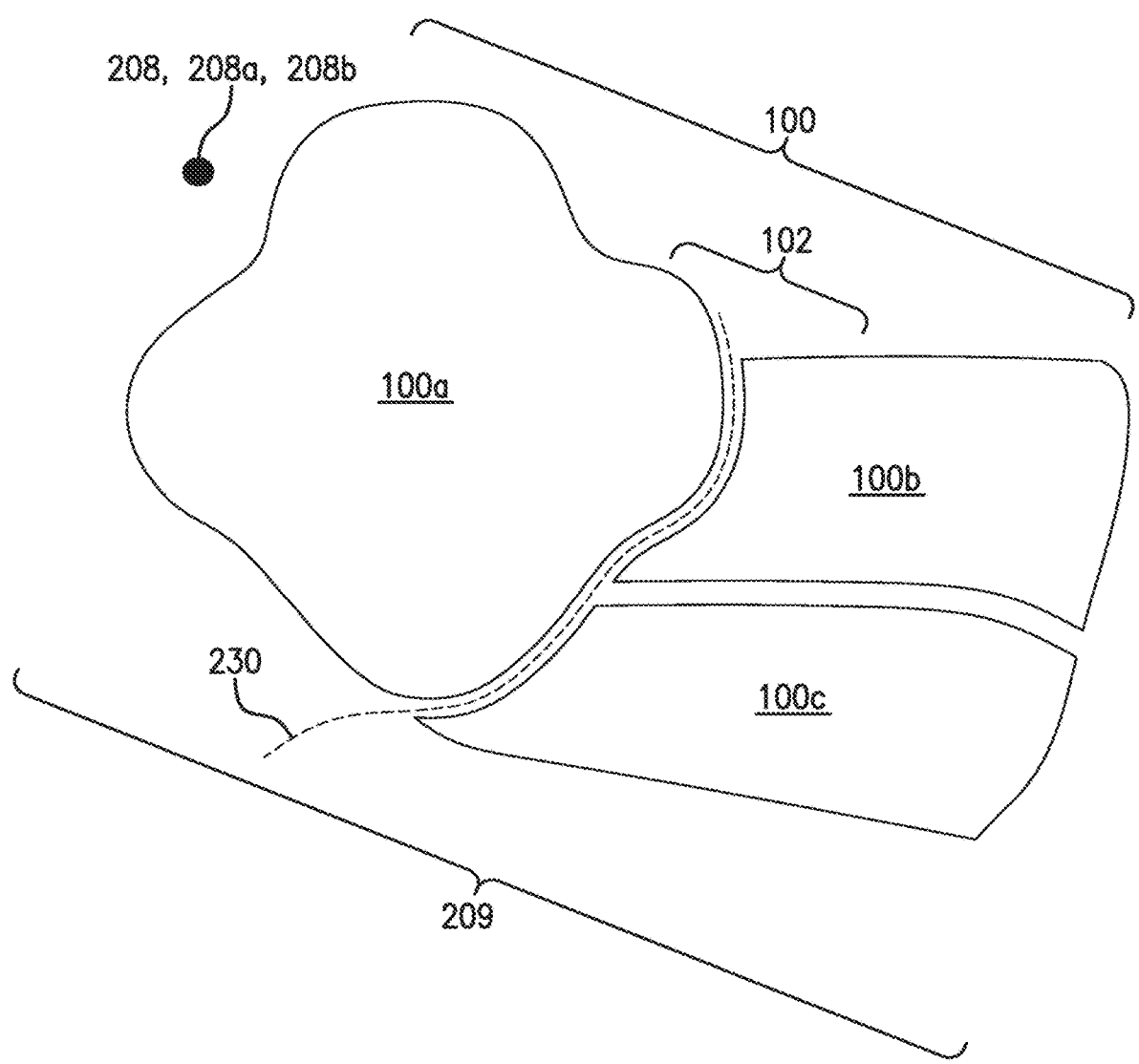
FIG. 2 illustrates an embodiment of an exemplary protective multi-sectional garment pad.

Additionally, a single pad or a panel 100a, 100b, 100c may be provided, as may be multiple pads or panels 100, such as in an interlocking format 100, such as in order to optimize flexibility and mobility in various contexts. By way of non-limiting example, FIG. 2 illustrates protective equipment 208 for association with an athletics shirt, such as may be worn by a baseball pitcher, in which three panels 100a, 100b, 100c are interlocked 230 within a sports shirt 208a in order to allow maximum mobility for the athlete wearing the shirt.

Those skilled in the art will further appreciate that, in a multiple panel and/or interlocking panel context, all panels may not be uniform in size or shape, and different ones of the panels may be provided differently in order to optimize protective coverage. By way of non-eliminating example, the two smaller more rectangular pads 100b, 100c shown in the three panel combination of FIG. 2 may be separately provided from the larger protective panel 100a shown in that figure. For example, the two "side" panels 100b, 100c may be provided via a VELCRO® feature, wherein, a catcher's chest protector, the two side panels may be VELCROED onto a chest protector including the larger panel, and wherein the location of such attachment may vary in order to best protect the wearer's heart 102. Accordingly, chest protectors and like equipment having an integrated protective pad or pads may have additional detachable protective equipment pads that further protect side or other portions of the body, and such detachable pads may be connectible via VELCRO®, snaps, zippers, or like detachable features.

In additional and alternative embodiments, any equipment comprised of the layers discussed herein throughout may additionally be comprised of other layers or protective aspects. By way of non-limiting example, a chest protector may include a pad or pads in accordance with the disclosed aspects only in physical locations correspondent to a prospective commotio cortis event, and may have known, i.e., low density, foam types at other portions of the chest protector, as would be typical of chest protectors in the known art.

In the foregoing detailed description, it can be seen that various features are grouped together in individual embodiments for the purpose of brevity in the disclosure. This method of disclosure is not to be interpreted as reflecting an intention that the subsequently claimed embodiments require more features than are expressly recited in each claim.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather are to be accorded the widest scope consistent with the principles and novel features disclosed herein.

What is claimed is:

1. A protective garment capable of preventing commotio cordis due to a concussive blow to a human cardiac system within a chest of a user human body wearing the protective garment, including a concussive blow to a side aspect of the human cardiac system having a heightened susceptibility to the commotio cordis and which is enclosed particularly within a left-lateral portion the chest of the user, comprising:
   a garment body;
   at least one pocket embedded in the garment body and placed over at least the left-lateral portion and a center of the chest of the user;
   at least one multi sectional pad in the at least one pocket and positioned by wearing of the garment body to, specifically cover the human cardiac system at both the center and only the left-lateral portions of the chest, the multi-sectional pad comprising:
      a first section of the multiple pad sections having a cloverleaf shape and covering the center of the chest during wearing;
      a second and third of the multiple pad sections being immediately adjacent to one another and being shaped and sized to fit integrally with the first section, and to protect specifically the left-lateral portion of the chest from the wearer's left side without any contiguous portion thereof covering the center of the chest of the wearer;
      the first, second and third sections each comprising:
         an aramid layer; and
         a multi-durometer foam layer having a substantially similar surface area to a surface area of the aramid layer.

2. The protective garment of claim 1, wherein the multi-durometer foam layer comprises a high-density foam and low-density foam in combination.

3. The protective garment of claim 2, wherein the high density foam has a density in a range of about twelve to about thirty-two pounds per cubic foot.

4. The protective garment of claim 3, wherein the high density foam has a density of about twenty pounds per cubic foot.

5. The protective garment of claim 2, wherein the low density foam has a density of about three to about twelve pounds per cubic foot.

6. The protective garment of claim 5, wherein the low density foam has a density of about nine pounds per cubic foot.

7. The protective garment of claim 1, wherein the at least one multi-durometer foam layer comprises a nine-pound per cubic foot density foam configured to position outside the human body and configured to locate over the human cardiac system, and a thirty-one pound per cubic foot density foam distally from the human body.

8. The protective garment of claim 1, wherein the first, second and third sections each further comprise a shield layer.

9. The protective garment of claim 8, wherein the at least one shield layer is adapted to be most adjacent of the aramid, the multi-durometer foam layer, and the shield layer to the human cardiac system.

10. The protective garment of claim 8, wherein the shield layer comprises a polypropylene polymer.

11. The protective garment of claim 1, wherein the aramid layer comprises an elastomeric coating on both sides thereof.

12. The protective garment of claim 1, wherein the garment body comprises a lacrosse chest protector.

13. The protective garment of claim 1, wherein the garment body comprises a baseball chest protector.

14. The protective garment of claim 1, wherein the garment body comprises an athletic shirt.

15. The protective garment of claim 1, wherein the athletic shirt comprises a sweat-wicking fabric.

* * * * *